United States Patent [19]

Halek et al.

[11] 4,223,128
[45] Sep. 16, 1980

[54] PROCESS FOR PREPARING POLYETHYLENE TEREPHTHALATE USEFUL FOR BEVERAGE CONTAINERS

[75] Inventors: George W. Halek, Summit; William T. Freed, Madison; Jerome S. Schaul, Caldwell, all of N.J.; Raymond W. Rupp, Greenville; Stanley L. Pauls, Taylors, both of S.C.

[73] Assignee: Celanese Corporation, New York, N.Y.

[21] Appl. No.: 906,393

[22] Filed: May 16, 1978

[51] Int. Cl.$^2$ .............................................. C08G 63/22
[52] U.S. Cl. ..................................... 528/481; 528/309; 528/503
[58] Field of Search ...................... 528/481, 503, 309

[56] References Cited

U.S. PATENT DOCUMENTS

| 2,503,251 | 4/1950 | Edwards et al. | 260/860 |
|---|---|---|---|
| 2,912,457 | 11/1959 | Blaser et al. | 528/481 |
| 3,075,952 | 1/1963 | Coover, Jr. et al. | 260/75 |
| 3,305,532 | 2/1967 | Middleburg et al. | 260/75 |
| 3,349,499 | 3/1967 | Katano | 34/10 |
| 3,544,525 | 3/1968 | Balint et al. | 260/75 |
| 3,547,890 | 12/1970 | Yamada et al. | 260/75 |
| 3,728,309 | 4/1973 | Maxion et al. | 260/75 M |
| 4,064,112 | 12/1977 | Rothe et al. | 260/75 T |
| 4,069,194 | 1/1978 | Gey et al. | 260/40 R |
| 4,069,278 | 1/1978 | Borman et al. | 260/860 |

OTHER PUBLICATIONS

Whitehead, "The Crystallization and Drying of Polyethylene Terephthalate", 16 Ind. Eng. Chem., Process Des. Dev. (No. 3), 341 (1977).
Perry's Chemical Engineers' Handbook, 5th Ed., McGraw-Hill, 1973, Section 22, pp. 52-54.
Buyers' Guide Issue of Chemical Engineering, Feb. 17, 1978.
Panametrics, Inc. of Waltham, MA, Data Sheet & Operating Manual for Model 600 Hygrometer.

Primary Examiner—Hosea E. Taylor
Assistant Examiner—Amelia B. Yarbrough
Attorney, Agent, or Firm—Kenneth A. Genoni

[57] ABSTRACT

There is disclosed a process for reducing the acetaldehyde content and the generation rate of acetaldehyde of polyethylene terephthalate chip which has a crystallinity of at least about 30% in order to render the polyethylene terephthalate suitable for making containers which are useful in the carbonated beverage industry. This process comprises stabilizing the polyethylene terephthalate by heating it at an elevated temperature in air and maintaining an air to chip ratio at a predetermined value of at least about 0.8 standard cubic foot of air per minute/pound of resin per hour and at a vapor velocity of at least about 0.5 foot per second. The air used in the stabilization process has a dew point of less than about −30° C.

The stabilized polyethylene terephthalate produced by this process has an acetaldehyde level of less than about 2.5 parts per million, a generation rate of acetaldehyde of less than about 3.0 parts per million per minute and an intrinsic viscosity of from about 0.60 to about 0.95 deciliters per gram.

There is also disclosed a process for molding a polyethylene terephthalate preform comprising melting the above described polymer, forming it into the desired preform shape, and cooling the molten polymer. This preform may then be reheated above its glass transition temperature and molded into the desired container shape.

15 Claims, 1 Drawing Figure

PROCESS FOR PREPARING POLYETHYLENE TEREPHTHALATE USEFUL FOR BEVERAGE CONTAINERS

BACKGROUND OF THE INVENTION

1. Field of the Invention

This invention relates to improved polymers useful in molding containers such as bottles. More specifically, this invention relates to polyethylene terephthalate which is useful in making bottles which are employed in the carbonated beverage industry.

2. Summary of the Prior Art

The hazards of using glass containers, particularly glass bottles, for beer or carbonated beverages are well known. Breakage of such bottles often takes place due to the internal pressure exerted by the pressurized gas in the carbonated beverage or beer as well as by dropping the bottles and other impacts caused by external forces which occur not only in the course of production and distribution of the bottled product, but also as a result of handling of the bottled product by consumers. Such breakage may result in injuries to the human body.

Recently, the carbonated beverage industry has begun to use plastic, rather than glass, bottles for their carbonated beverages. Besides avoiding the hazards of using glass containers, the use of plastic, rather than glass, is advantageous in that plastic bottles are much lighter than glass bottles. Furthermore, less energy is required to make and transport plastic bottles.

Polyethylene terephthalate (hereinafter "PET") is a polymer which is well suited for such applications. PET may be prepared, as is well known, by the esterification of ethylene glycol and terephthalic acid or by the ester interchange of dimethyl terephthalate with ethylene glycol, followed by polycondensation in the presence of a catalyst such as antimony trioxide, at a temperature of 285° C. and at a pressure of 1 millimeter of mercury. The PET product may then be extruded and pelletized. Unfortunately, these PET pellets cannot be used in the preparation of carbonated beverage bottles, because excessively large amounts of acetaldehyde are produced in the pellets under the conditions by which they are normally made. Furthermore, even if all of this residual acetaldehyde were removed from the PET pellets, it has been found that additional acetaldehyde is generated when a preform is molded from the PET, the molding occurring at temperatures generally above 240° C. The presence of acetaldehyde usually affects the taste of any carbonated beverage, but particularly a cola flavored beverage which might be placed in such a container.

Accordingly, a commercially acceptable PET bottle must be prepared from PET which has insignificant amounts of acetaldehyde present and which does not generate significant additional amounts of acetaldehyde when heated for molding into a container or bottle.

It is also advantageous that the PET which is used in making the containers or bottle have a desirably high intrinsic viscosity, i.e., above about 0.60 deciliters per gram as calculated from measurements made on an 8% solution in o-chlorophenol at 25° C. It is known that the intrinsic viscosity of PET may be increased by solid state polymerization in the presence of an inert gas such as nitrogen. In this connection, see, e.g., U.S. Pat. No. 4,064,112. The use of such inert gases in solid state polymerization processes is undesirable, however, because of economic considerations.

The search has continued for improved processes for reducing the acetaldehyde level and the generation rate of acetaldehyde in PET as well as for improved solid state polymerization processes wherein the intrinsic viscosity of PET is increased. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a process for reducing the acetaldehyde level of PET which is intended for use in preparing PET containers such as carbonated beverage containers.

Another object of the present invention is to provide a process for reducing the generation rate of acetaldehyde of PET which is intended for use in preparing PET containers such as carbonated beverage containers.

Still another object of the present invention is to provide a process for increasing the intrinsic viscosity of PET which is intended for use in preparing PET containers.

Another object of the present invention is to provide a process for reducing the acetaldehyde level and generation rate of acetaldehyde of PET and increasing its intrinsic viscosity without the need for employing gases other than air.

Other objects and advantages of the invention will become apparent from the following summary and description of the preferred embodiments of the present invention.

In one aspect, the present invention provides a process for reducing the acetaldehyde content and the generation rate of acetaldehyde of PET chip which has a crystallinity of at least about 30% in order to render the PET suitable for making containers.

This process comprises stabilizing the PET by heating it at a temperature of about 180° to about 220° C. for from about 2 to about 20 hours in air and maintaining an air to chip ratio at a predetermined value of at least about 0.8 standard cubic foot of air per minute/pound of resin per hour (hereinafter "scfm/pph") and at a vapor velocity of at least about 0.5 foot per second, the air having a dew point of less than about −30° C.

The acetaldehyde level of the stabilized PET is reduced to less than about 2.5 parts per million, the generation rate of acetaldehyde is reduced to less than about 3.0 parts per million per minute, and the intrinsic viscosity is increased to a value in the range of from about 0.60 to about 0.95 deciliters per gram as calculated from measurements made on an 8% by weight solution in o-chlorophenol at 25° C.

In another aspect, the present invention provides a process for molding a PET container. This process comprises melting the above-described polymer, forming it into the desired shape and cooling the molten polymer.

DESCRIPTION OF THE PREFERRED EMBODIMENTS

Figure 1:
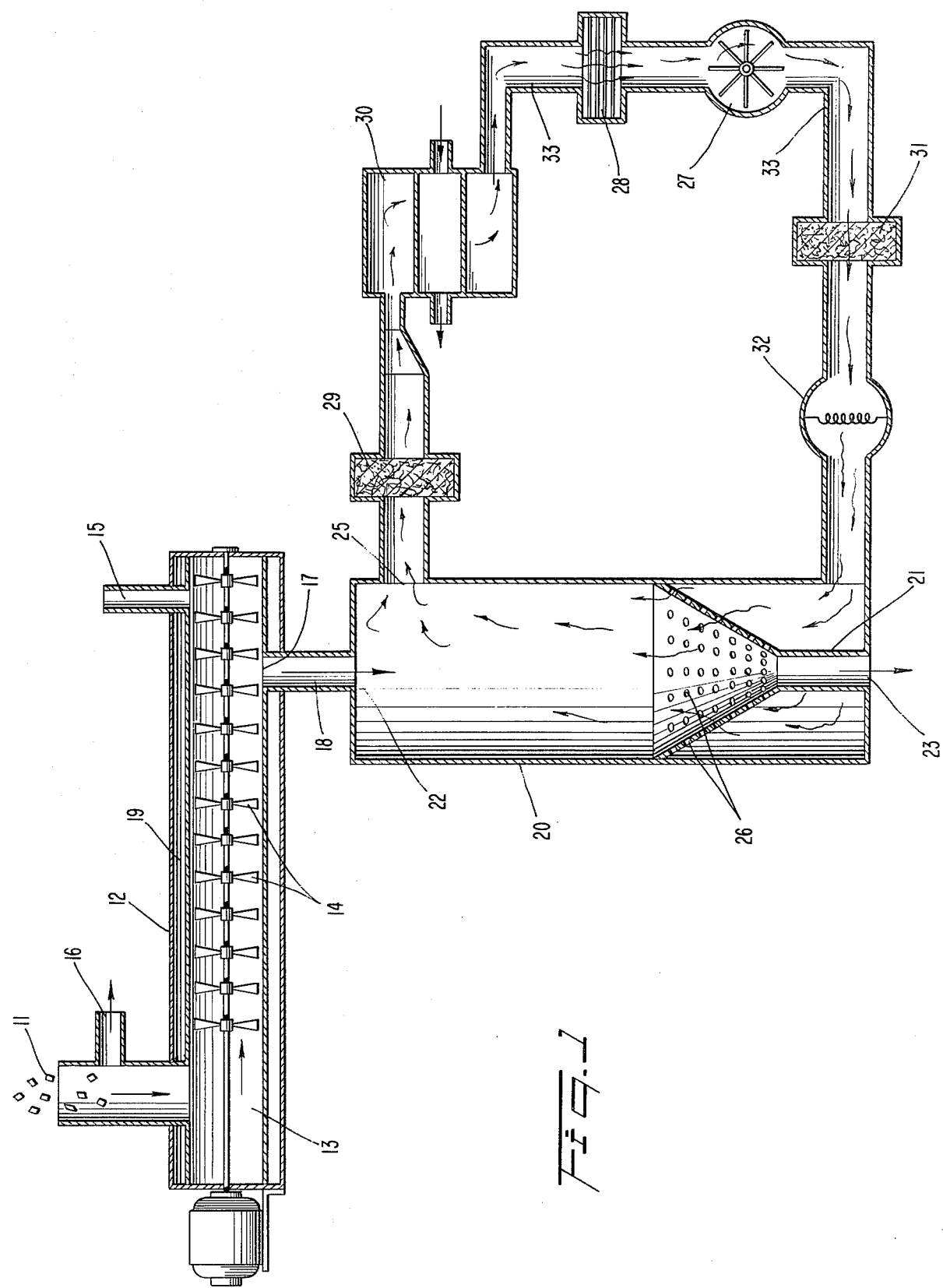
FIG. 1 illustrates an arrangement of apparatus which is useful in carrying out the process of the present invention.

The terms "polyethylene terephthalate" and "PET" as used herein are meant to include PET no matter how prepared. Furthermore, these terms are meant to include polyethylene terephthalate polymers which are reacted with minor, e.g., less than about 20 percent by weight of the polymer, amounts of modifying agents. Such modifying agents include various diols such as 1,4 butane diol, cyclohexane dimethanol and 1,3 propane diol. Other modifying agents include various diacids such as isophthalic acid, adipic acid, 2,6 naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Ser. No. 894,674 filed Apr. 10, 1978 (now U.S. Pat. No. 4,161,579) by Edelman et al and entitled "Extrusion Grade Polyethylene Terephthalate". The disclosure of this patent application is hereby incorporated by reference.

Although the terms "polyethylene terephthalate" and "PET" are meant to include polyethylene terephthalate polymers containing minor amounts of modifying agents or chain branching agents, the remainder of this specification, for purposes of illustration, is generally directed to PET which does not contain these modifying agents or chain branching agents.

The PET useful in the process of the present invention may be prepared by any means known to those having ordinary skill in this art. For example, the PET may be prepared by the esterification of ethylene glycol and terephthalic acid or by the ester interchange of dialkyl esters of terephthalic acid such as dimethyl terephthalate with ethylene glycol, followed by polycondensation in the presence of a catalyst such as antimony trioxide at a temperature of 285° C. and a pressure of 1 millimeter of mercury.

The PET reaction product may then be extruded at a temperature of 285° C. and a pressure of one atmosphere into water and allowed to solidify therein. The solid PET may then be pelletized by means known to those skilled in this art. For example, the PET may be pelletized using an underwater pelletizer.

The PET useful in the present invention may be in any form such as pellets, chips, or granules. For ease of reference, the PET will hereinafter be referred to as "PET chip" but it is understood that the present invention is applicable to PET in any form and the term "PET chip" is meant to include PET in any form. Any shape PET pellets, chips or granules may be used in the present invention. For example, cubes, spheres or cylindrically shaped particles may be used, although cube or "dog-bone" shaped particles are preferred.

The PET chip must not be too small or the particles will have a tendency to stick together somewhat. They should not be too large, either, because the stabilization reaction would not proceed rapidly enough with particles which are too large because this reaction is diffusion related. The maximum length of the side of the PET chips, if substantially cubic shaped chips were used, is about ¼ inch. Preferably, cubes which are ⅛ inch on a side are employed.

After the PET has been pelletized, the surface water on the PET is removed by mechanical means such as by blowing air at ambient temperatures on the pellets or chips.

The PET prepared as described above has an intrinsic viscosity of generally from about 0.55 to about 0.75, typically from about 0.60 to about 0.70, and preferably from about 0.62 to about 0.68 deciliters per gram as calculated from measurements made on an 8 percent by weight solution in o-chlorophenol at 25° C.

The PET as thus produced has an acetaldehyde content of generally at least about 20, typically at least about 35, and more likely at least about 50 parts per million parts of PET and a generation rate of acetaldehyde (hereinafter "GRA") of generally at least about 4, typically at least about 4.5, and more likely at least about 5 parts of acetaldehyde per million parts of PET per minute.

The acetaldehyde content of a sample of PET is determined by grinding the sample to a fine powder under liquid nitrogen. This powder is then placed in a gas chromatograph, heated to 150° C., and the amount of liberated acetaldehyde is determined by comparing the peak produced to a standard.

The GRA of a sample of PET may be measured by grinding the particular sample to a fine powder under liquid nitrogen, degassing the sample at 150° C. for 20 minutes in a nitrogen stream to remove any contained acetaldehyde, holding the sample in a specially designed injection port of a gas chromatograph at 280° C.±0.5° C. for precisely 10 minutes and allowing the volatile materials to condense on a column which is at room temperature, separating the sample from the column after 10 minutes, heating the column to 150° C., and measuring the peaks from the gas chromatograph read-out. The total amount of acetaldehyde that is liberated is determined by reference to a standard. This total amount, in parts per million, is then divided by the time (10 minutes) to give the number of parts of acetaldehyde per million of PET per minute.

Precise timing and temperature control is needed to ensure the precision of this GRA test. Furthermore, the injection port of the gas chromatograph should be designed to have the entire sample tube surrounded by a large thermal mass material which is held at 280° C.±0.5° C. This large thermal mass ensures a rapid and reproducible heating of the entire sample to the test temperature. This GRA test assumes that there is no time lag between injection of the sample and arriving at the test temperature.

The GRA is temperature dependent. Throughout the instant specification and claims, values of GRA are all obtained at 280° C.

The difference between acetaldehyde level and GRA is that the acetaldehyde level represents the amount of acetaldehyde actually present in the PET pellets or chips at any particular time whereas the GRA represents the rate at which acetaldehyde may be generated when the PET pellets or chips are again heated at temperatures at which PET may be molded into plastic containers.

The amorphous PET prepared as described above has substantially no crystallinity, i.e., a crystallinity of generally less than about 10, typically from about 4 to about 8%. By "crystallinity" is meant the arrangement of polymer molecules in regular patterns that are relatively dense and cohesive. Thus, as the degree of crystallinity increases, the mobility of the individual polymer units becomes more limited, thereby providing rigidity and dimensional stability to the product, especially at temperatures above room temperature. The degree of crystallinity may be determined by X-ray crystallography or by other means known to those skilled in this art. In the instant specification, the degree of crystallinity is determined by density measurements. The density of PET having 0 percent crystallinity is determined and that having 100 percent crystallinity is calculated from the dimensions of the unit cell. Intermediate percentages of crystallinity are interpolated therefrom.

Amorphous PET cannot be directly stabilized by the process of the present invention since the PET passes through a tacky stage when it is being raised to the stabilization temperature, causing it to sinter if it is not sufficiently agitated. Furthermore, when the PET is heated at sufficiently high temperatures for sufficiently long time periods, it begins to crystallize. Crystallization is an exothermic process. Thus, heat is given off during this crystallization process. This heat of crystallization tends to enhance the tackiness and sintering tendency of the PET, and thus contributes to the need for agitation while the PET is crystallizing.

In order to avoid this sintering, PET which is not sufficiently crystallized may be first crystallized at temperatures which may be higher or lower and for residence times which are preferably comparatively shorter than those used in the stabilization step. As will be discussed hereinbelow, if a continuous process comprising crystallization followed by stabilization is desired, and if a low air to chip ratio in the stabilization step is also desired, the temperature during the crystallization step should be as high as possible, preferably above about 190° C. Agitation of the PET allows the PET to crystallize without agglomerating.

The PET must be agitated sufficiently so that it does not agglomerate or sinter during the crystallization step. Such agitation may be carried out by any means known to those skilled in this art. For example, the crystallization step may be carried out in a fluidized bed, or a stirred bed, or in a vessel that contains one or more rotating screws, or by any other means known to those skilled in this art. The PET must be kept in constant motion to prevent agglomeration or sintering.

It should be noted that if the PET chip is spread out in a sufficiently shallow layer such that there is substantially no chip to chip contact pressure, then substantially no agitation is needed since the possibility of agglomeration is reduced almost to zero. If each chip were spread out in such a way that there is no chip to chip contact, then agitation is not needed since there would be no opportunity for agglomeration to take place.

The result of this crystallization step is to increase the crystallinity of the PET to generally at least about 30, and preferably from about 35 to about 45 percent. The purpose of this step is to prevent the PET chips from sticking together during the stabilization step.

This crystallization step may be carried out at a temperature of generally from about 110° to about 240°, typically from about 130° to about 225°, and preferably from about 150° to about 210° C. for generally at least about 3, typically from about 4 to about 40, and preferably from about 5 to about 20, minutes. These time and temperature conditions apply for unmodified PET. For PET which contains minor amounts of modifying or chain branching agents, somewhat different ranges may be used as would be apparent to those skilled in this art in view of this disclosure.

The degree of crystallization is determined by the maximum temperature at which crystallization is carried out. The extent to which this maximum degree of crystallinity is attained is directly dependent upon the time that the PET is kept at this temperature.

If a temperature less than about 110° C. is employed, then there results insufficient crystallization in the PET such that significant sintering would take place when the PET is subsequently treated in the stabilization vessel. If a temperature of more than about 240° C. is employed, then the time required for crystallization is excessive. At temperatures in excess of 250° C., the PET would not crystallize, thus defeating the purpose of the step. If a heating time of less than about 3 minutes is employed, there results insufficient crystallization in the PET such that significant agglomeration would take place if it were subsequently treated in the stabilization step.

This crystallization step results in a PET product which has an acetaldehyde level of generally less than about 20, typically less than about 15, and preferably less than about 10, parts of acetaldehyde per million parts of PET.

This PET has a moisture content of generally from about 0.01 to about 0.04, and typically from about 0.02 to about 0.03 percent by weight based upon the weight of the PET.

The crystallization step may be carried out in any apparatus in which the PET may be agitated and exposed to the temperatures described above for the time period described above. Such an apparatus should also provide for some gas flow to carry away volatile material such as moisture and volatile organics which may be contained in the PET. The gas which is used to remove these volatile materials may be any gas such as air or an inert gas such as nitrogen, carbon dioxide, helium or neon. Air is a preferred gas in view of economic considerations.

A preferred crystallizer for carrying out this crystallization step comprises a horizontal cylindrical vessel which is jacketed and contains a rotating central shaft or drum and paddles which are attached to that central shaft or drum. The paddles are rotated at a rate of generally from about 50 to about 500, typically from about 100 to about 400, and preferably from about 150 to about 300 revolutions per minute. The paddles extend almost to the inside diameter of the cylinder with a clearance which is less than the minimum chip dimension. The jacket of the crystallizer is heated to the temperature at which the crystallization step is carried out. The angle of the paddles is adjusted so that the PET is in the crystallizer for the desired residence time.

A preferred crystallizer for use in the instant process is a Solidaire crystallizer. Other crystallizers which may be used include the Thermascrew crystallizer and the Holoflite crystallizer. These Thermascrew and Holoflite crystallizers have helical flights on a shaft which rotates at less than 150 rotations per minute.

The air or other gas which is used to carry away the volatile materials from the crystallizer flows through the crystallizer at a rate of generally from about 1 to about 50, typically from about 2 to about 20, and preferably from about 5 to about 10% of the rate of the air flow through the stabilizer. The amount of air or other gas used to carry away the the volatile materials is not critical, however.

The second step of the process of the present invention comprises the stabilization of the crystallized PET by heating it to a temperature of generally from about 180 to about 220, typically from about 185 to about 215, and preferably from about 190° to about 210° C., for generally from about 2 to about 20, typically from about 4 to about 16, and preferably from about 6 to about 12, hours. These time and temperature conditions apply for unmodified PET. For PET which contains minor amounts of modifying or chain branching agents, somewhat different ranges may be used as would be apparent to those skilled in this art in view of this disclosure.

At temperatures substantially below about 180° C., there results PET which has an unacceptably high GRA. At temperatures substantially above about 220° C., the resulting PET has a yellow color which makes it unsuitable for use in the preparation of bottles. When the crystallized PET pellets are heated for residence times substantially greater than about 20 hours, the resulting PET has a yellowish color which makes it unsuitable for use in the preparation of bottles. When the crystallized PET is heated for a residence time substantially less than about 2 hours, there results PET which may have a lower than desired intrinsic viscosity and an unacceptably high GRA which makes it unsuitable for use in making bottles for carbonated beverages.

The product resulting from this stabilization step has an acetaldehyde content of generally less than about 2.5, typically less than about 2.0, and preferably less than about 1.5 parts of acetaldehyde per million parts of PET, and a GRA of generally less than about 3.0, typically from about 2 to about 3, and preferably from about 2.2 to about 2.6 parts of acetaldehyde per million parts of PET per minute.

The intrinsic viscosity of this product is generally from about 0.60 to about 0.95, typically from about 0.65 to about 0.85, and preferably from about 0.70 to about 0.80, deciliters per gram based upon calculations made from measurements on an 8% solution in o-chlorophenol at 25° C.

The moisture content of the PET product is generally less than about 0.005, typically less than about 0.004, and preferably less than about 0.003 percent by weight of the PET.

It has been found that this stabilization step, which results in an intrinsic viscosity increase, may be carried out in the presence of air. Such a discovery is unexpected in view of the well-known belief among those skilled in this art that solid state polymerization must be carried out in the substantial absence of oxygen. For example, U.S. Pat. No. 4,064,112 discloses that high molecular weight polyethylene terephthalate may be prepared by solid state polycondensation in the presence of an inert gas such as nitrogen. The presence of more than insignificant amounts of oxygen gas is disclosed as leading to undesirable yellowing of the PET. For example, when more than about 10 parts of oxygen per million parts of nitrogen gas are used, this patent discloses that severe deterioration in the color of the granulate occurs.

In contrast, applicants have discovered that when the stabilization step is carried out in air (which contains about 20% oxygen), there results a PET product which has a color which is essentially the same as that obtained in nitrogen which contains no more than about 10 parts of oxygen per million parts of gas mixture.

In the present invention it has been determined that air may be used in the stabilization process as long as the dew point of this air, the air to chip ratio and the vapor velocity meet certain requirements.

By "air to chip ratio" is meant the ratio obtained by dividing the volume flow rate of air through the PET in standard cubic feet per minute (scfm) by the weight flow rate of PET in pounds per hour (pph). Thus, air to chip ratio is expressed in units of standard cubic feet of air per minute/pound of PET per hour (scfm/pph).

The air to chip ratio during the stabilization step must be at least about 0.8, typically from about 0.85 to about 4, and preferably from about 0.95 to about 2.5 scfm/pph.

The minimum air to chip ratio which is required is related to the temperature of the PET chip which enters the stabilizer. For example, if the PET chip enters the stabilizer directly from the crystallizer and is therefore "hot" chip, the air to chip ratio should be at least about 0.8, typically from about 0.85 to about 4, and preferably from about 0.95 to about 2.5 scfm/pph. However, if PET chip which is at room temperature (i.e., "cold" chip) is employed, the air to chip ratio must be generally at least about 1, typically from about 1 to about 4, and preferably from about 1.25 to about 2.5 scfm/pph.

By "vapor velocity" or "superficial vapor velocity" is meant the ratio obtained by dividing the volume flow rate of air through the PET, in cubic feet per second, by the cross-sectional area of the reaction vessel (measured perpendicular to the air flow direction and without considering the area occupied by the PET), in square feet. Thus, the vapor velocity is in units of feet per second. The vapor velocity must be at least about 0.5, typically from about 0.5 to about 4, preferably from about 1 to about 2 feet per second.

When the air to chip ratio is less than about 0.8 scfm/pph for "hot" chip or less than about 1 scfm/pph for "cold" chip, and/or the vapor velocity is less than about 0.5 feet per second, the PET begins to yellow and agglomerate. When the vapor velocity is substantially more than about 4 feet per second, it interferes with the gravity flow and discharge through the reactor. The upper limit on the air to chip ratio is established by economics. Thus, as low an air to chip ratio as possible is desirable.

The air used in this stabilization step must be low dew point air, i.e., the dew point of this air should be generally lower than about −30° C., typically from about −30° to about −100° C., and preferably from about −40° to about −80° C. When air having a dew point higher than about −30° C. is used, the intrinsic viscosity of the PET may decrease rather than increase during the stabilization step due to the hydrolytic degradation of the PET by moisture in the PET chip. Low dew point air, such as that employed in the present invention, provides the driving force for diffusion of moisture from the interior to the surface of the PET chip and evaporation of that water from the surface of the PET chip.

Any apparatus which may be heated to the above described temperatures for the desired residence time and which is adaptable to the other process parameters described above may be used in the stabilization step. One particular reactor which may be used in the process of the present invention comprises a vertical cylindrical reactor having a height of 10 feet and a 20 inch internal diameter. The reactor funnels down to a pipe which has a diameter of about 4 inches. The funnel section is perforated with holes such that low dew point air which is introduced around the pipe enters through the holes and makes contact with the PET chip or pellets. Gaseous material containing the air, moisture and volatile organic materials such as acetaldehyde is removed from the top of this reactor and this gas is cleansed of the moisture and volatile organics and recycled. The gas leaves the top of the reactor and is preferably recirculated. Although the air may be heated, passed over the PET and then exhausted, the increased energy cost inherent in such a process might be prohibitive.

After the heated air is passed over and through the polymer, it may be recirculated by passing it through an adsorbent for the organics and moisture such as a Linde molecular sieve. Alternatively, the air may be passed through a substance which reacts with the organics (preferably a substance which reacts with acetaldehyde) and then some other means may be used to remove the moisture. For example, a desiccant such as $P_2O_5$ may be employed. Preferably, the air is recirculated through a bed containing Linde molecular sieve type 13X which strips the air of the moisture and organics such that the remaining gas is predominately air, contains less than about 2 parts per million of acetaldehyde and has a dew point of less than about $-30°$ C. The treated air is then reinjected into the reactor.

If large amounts of PET are to be stabilized, it is preferred to use a commercial size stabilizer. Any commercial scale PET drying device having continuous column driers would be useful in the presently claimed invention. This PET drier could be a single or two stage drier which is designed for proper mass flow. A preferred commercial stabilizer comprises a two stage cylindrical reactor in which the PET is a moving bed. The reactor is preferably thermally insulated to reduce energy loss and to minimize horizontal temperature gradients in the bed of chip and in the air stream. The upper stage has a height of about 35 feet, and a diameter of about 6 or 7 feet. This upper stage funnels down to a second stage which has a diameter of about 4 feet. This second stage in turn funnels down to a pipe which has a diameter of about 12 inches. Low dew point air may be introduced into the stabilizer at the funnel position between the upper and lower stages and also at the funnel which is at the bottom of the lower stage.

The air which is introduced into the stabilizer at two different positions may either be at the same or different temperatures. If the air which is introduced at the bottom of the first stage is at a temperature which is different from that of the air which is introduced at the bottom of the second stage, this temperature difference is typically less than about 10° C. Mass flow of the PET chip through this stabilizer may be regulated by means known to those skilled in this art.

Although the process of the present invention has been described as employing a crystallizer and a separate stabilizer, it is possible to carry out the process in a single apparatus which provides means for agitating the PET to prevent agglomeration or sintering and means for providing the low dew air at the proper air to chip ratio, temperature and vapor velcoity.

Both the crystallization and the stabilization steps may be carried out at subatmospheric, superatmospheric or substantially atmospheric pressures. Substantially atmospheric pressures are preferred, however.

Both steps, as well as the combined process, may be carried out on a continuous, semi-continuous or batch basis as desired. On a batch scale, the requirement of air to chip ratio, of course, would also apply.

The PET produced by the present invention may be used to produce containers such as PET bottles because of the small amount of acetaldehyde and the low GRA of this PET. One who molds such bottles is given a greater latitude with respect to the temperature and time conditions under which he forms the bottles than be would have if the bottles had a larger GRA. For example, since the GRA of this PET is so low, one who molds such a bottle would be able to use higher temperatures and/or longer residence times in the injection molding machine than he would have been able to use had the GRA of the PET not been as low, and still provide a bottle which is useful for containing a carbonated beverage. Alternatively, one who molds a bottle from PET having a low GRA under optimum temperature and time conditions could provide a bottle which has superior characteristics because of this low GRA.

PET having very low GRA is particularly useful for making containers for cheese since cheese is very sensitive to the presence of acetaldehyde. Also, PET having low GRA values is particularly useful in the preparation of small PET bottles where the ratio of surface area to volume is larger than it is with larger bottles. Bottles having a large surface area to volume ratio would more easily transfer acetaldehyde to its contents than would a larger bottle.

The PET produced by the process of this invention may be molded into containers. The PET may be molded by melting the above-described PET, forming it into the desired container shape, and cooling the molten PET. The PET may be molded by so-called reheat blow molding, injection blow molding, and/or extrusion blow molding. If extrusion blow molding is desired, it is important to include with the PET minor amounts of the modifying or chain branching agents described hereinabove in order to sufficiently increase the melt strength of the PET.

The PET polymer may be molded by melting the PET, forming it into a desired preform shape, cooling the molten preform, reheating the preform above its glass transition temperature, and then blow molding into the desired container shape.

The PET may also be extruded into sheets and cooled. Containers may be formed from these sheets.

The PET may also be directly injection molded into a finished solid article by melting the PET, injecting it into a mold, and cooling the PET to room temperature.

The following Examples are given as specific illustrations of the claimed invention. It should be understood however, that the invention is not limited to the specific details set forth in these Examples. All parts and percentages in the Examples as well as in the remainder of the specification are by weight unless otherwise specified.

EXAMPLE I

This Example is described in connection with FIGURE I.

Eighty pounds per hour of amorphous PET pellets or chips (11) which have been pelletized in an underwater pelletizer to about ⅛ inch cubes are added to a horizontal crystallizer (12) which comprises a one foot diameter cylinder with a central drum (13) which has multiple paddles (14) attached thereto. The paddles rotate at a rate of 200 rotations per minute and are positioned such that the pellets or chips have an average residence time of 10 minutes in the crystallizer. The paddle length is such that the clearance between the end of the paddle and the diameter of the cylinder is less than ⅛ inch. The jacket (19) of the crystallizer is heated to 175° C.

Air enters crystallizer (12) through inlet port (15) at a rate of 20 standard cubic feet per minute and at a temperature of about 175° C. and leaves through exit port (16). PET pellets or chips leave the crystallizer through exit port (17) and enter pipe (18) where they are transported to a vertical stabilizer (20).

The vertical stabilizer (20) has an internal diameter of 20 inches and a height of 10 feet. This reactor funnels down to a pipe (21) which has a diameter of about 4 inches. The funnel section is perforated with multiple holes (26) such that heated low dew point air which is introduced around the pipe enters through the holes and makes contact with the PET pellets. The crystallized PET pellets or chips enter the stabilizer through entry port (22) and follow a substantially unrestricted path down the stabilizer through the pipe and then leave the stabilizer through exit port (23). The average residence time of the pellets in the stabilizer is maintained at 10 hours by controlling the chip level in the unit and the chip discharge rate.

Air which is heated to 205° C. is circulated through the stabilizer entering it through holes (26). This air as well as the moisture and volatile organics given off by the PET chip leaves the stabilizer through exit port (25) and is recycled by means of a blower (27), and a piping system (33) and a bed containing Linde molecular sieve type 13X (28) which strips the air of the moisture and organics. The relative positions of the blower and the molecular sieve may be interchanged. In a particularly preferred embodiment, these positions are interchanged. Before entering the molecular sieve the air from the stabilizer first passes through a filter (29) which is used to remove polymer fines, and a heat exchanger (30) which is used to cool the air stream so that it can more readily impart its moisture to the desiccant.

After leaving the molecular sieve (28), the cool dry air passes through the blower (27) and then through a filter (31) which is used for removing desiccant fines and finally through a heater (32) which is used to raise the temperature of the air to the process temperature. The air is then returned to the stabilizer through holes (26). The air has a dew point of −60° C. The air flow rate is 150 standard cubic feet per minute and the vapor velocity is 1.15 feet per second. The air to chip ratio is 1.88 scfm/pph.

The properties of the PET pellets (a) before the crystallizing step, (b) after the crystallizing step but before the stabilizing step, and (c) after the stabilizing step are summarized in Table I hereinbelow. The data in Table I, as well as that in Tables II and III hereinbelow represent average numbers which are obtained as the result of a number of trials made on a continuous process under steady state conditions.

TABLE I

| Stage | (a) | (b) | (c) |
|---|---|---|---|
| Intrinsic Viscosity (dl/g)* | .64 | .64 | .74 |
| Acetaldehyde Content (ppm) | 30 | less than 10 | less than 2 |
| GRA (ppm/min.) | 4.5 | 4.5 | 2.2 |
| Crystallinity (% by volume) | 5 | 40 | 55 |

TABLE I-continued

| Stage | (a) | (b) | (c) |
|---|---|---|---|
| Water (%) | 0.4 | 0.04 | 0.003 |
| Agglomeration | None | None | None |
| Color (Hunter Color System)** | L 81 | 84 | 84 |
| | a −2.5 | −2.1 | −2.0 |
| | b 4.0 | 2.2 | 2.9 |

*calculated from measurements made on an 8% solution in o-chlorophenol at 25° C.
**The color is measured on the ground chip. It should be noted that the color changes somewhat in going from amorphous to crystallized chip because of the opacifying effect resulting from chip crystallinity.

The Hunter Color System is well known to those skilled in this art. In the present method, the PET is ground to a 2 millimeter mesh (i.e., the particles pass through a 2 millimeter screen which is on the bottom of a Wiley lab mill). The color of these particles is determined using a Gardner XL-23 Colorimeter.

The "L" value of the Hunter Color System measures the total percentage reflectance of a sample. A value of 100 represents perfect reflectance.

The particles are red if the "a" value is positive and green if the "a" value is negative. The particles are yellow if the "b" value is positive and blue if the "b" value is negative. One unit difference in these numbers is perceptible to the eye.

COMPARATIVE EXAMPLE I

Example I is repeated with the exception that the gas used in the stabilizer is pure nitrogen rather than air. The properties of the PET pellets (a) before the crystallizing step, (b) after the crystallizing step but before the stabilizing step, and (c) after the stabilizing step are summarized in Table II hereinbelow.

TABLE II

| Stage | (a) | (b) | (c) |
|---|---|---|---|
| Intrinsic Viscosity (dl/g)* | .64 | .64 | .74 |
| Acetaldehyde Content (ppm) | 30 | less than 10 | less than 2 |
| GRA (ppm/min.) | 4.5 | 4.5 | 3.5 |
| Crystallinity (% by volume) | 5 | 40 | 55 |
| Water (%) | 0.4 | 0.04 | 0.003 |
| Agglomeration | None | None | None |
| Color (Hunter Color System)** | L 81 | 84 | 85 |
| | a −2.5 | −2.1 | −2.0 |
| | b 4.0 | 2.2 | 2.9 |

*calculated from measurements made on an 8% solution in o-chlorophenol at 25° C.
**The color is measured on the ground chip. It should be noted that the color changes somewhat in going from amorphous to crystallized chip because of the opacifying effect resulting from chip crystallinity.

It may be seen that when nitrogen is used in this Comparative Example, the GRA (3.5) of the stabilized product is much higher than it is when air (2.2) is employed. The advantages of PET having as low a value of GRA as possible are detailed earlier in this specification.

COMPARATIVE EXAMPLE II

Example I is repeated with the exception that the gas used in the stabilizer is nitrogen which contains about 1,000 parts of oxygen per million parts of gas mixture by volume. The properties of the PET pellets (a) before the crystallizing step, (b) after the crystallizing step but before the stabilizing step, and (c) after the stabilizing step are summarized in Table III hereinbelow.

TABLE III

| Stage | (a) | (b) | (c) |
|---|---|---|---|
| Intrinsic Viscosity* | .64 | .64 | .74 |
| Acetaldehyde Content (ppm) | 30 | less than 10 | less than 2 |
| GRA (ppm) | 4.5 | 4.5 | 3.0 |
| Crystallinity (% by volume) | 5 | 40 | 55 |
| Water (%) | 0.4 | 0.04 | 0.003 |
| Agglomeration | None | None | None |
| Color (Hunter Color System) | L 84 | 87 | 88 |
| | a −2.6 | −2.1 | −2.0 |
| | b 4.2 | 2.3 | 5.6 |

*calculated from measurements made on an 8% solution in o-chlorophenol at 25° C.
**The color is measured on the ground chip. It should be noted that the color changes somewhat in going from amorphous to crystallized chip because of the opacifying effect resulting from chip crystallinity.

It may be seen that when 1,000 parts of oxygen per million parts of gas mixture comprising nitrogen and oxygen are used as in this Comparative Example, the PET stabilized product has a color which is significantly more yellow ("b" value of 5.6) than that produced when air ("b" value of 2.9) is employed.

COMPARATIVE EXAMPLE III

Example I is repeated with the exception that the first step is eliminated. The amorphous PET chips are sent directly to the stabilizer where they are heated under the conditions described in Example I. After about two hours, discharge from the stabilizer ceases and substantial numbers of the PET chips agglomerate thus preventing the flow through the unit.

EXAMPLE II AND COMPARATIVE EXAMPLE IV

The polyethylene terephthalate of Example I is melted, formed into a preform and cooled to room temperature. It is then reheated to a temperature above its glass transition temperature and blow molded to form a bottle which is useful as a container for carbonated beverages.

The PET stabilized in accordance with the present invention may be ultimately used to prepare containers such as bottles. The invention has particular utility for containers and especially bottles which are to contain substances whose taste or other properties would be affected by the presence of acetaldehyde. As noted hereinabove, this stabilized PET is particularly useful for preparing bottles which are to contain carbonated beverages. However, the stabilized PET is also useful in preparing containers, particularly bottles, which are to contain other substances such as alcoholic beverages.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. A process for reducing the acetaldehyde content and the generation rate of acetaldehyde of polyethylene terephthalate chip which has a crystallinity of at least about 30% in order to render the polyethylene terephthalate suitable for making containers, which process comprises stabilizing said polyethylene terephthalate by heating it at a temperature of about 180° to about 220° C. for from about 2 to about 20 hours in a countercurrent stream of air and maintaining an air to chip ratio at a predetermined value of at least about 0.8 standard cubic foot of air per minute/pound of polyethylene terephthalate per hour and at a vapor velocity of at least about 0.5 foot per second, said air having a dew point of less than about −30° C., in order to reduce the acetaldehyde level of said crystallized polyethylene terephthalate to less than about 2.5 parts per million, to reduce the generation rate of acetaldehyde to less than about 3.0 parts per million per minute, and to increase the intrinsic viscosity to a value in the range of from about 0.60 to about 0.95 deciliters per gram calculated from measurements made on an 8% by weight solution in o-chlorophenol at 25° C.

2. The process of claim 1 wherein the polyethylene terephthalate is heated for from about 4 to about 16 hours at a temperature of from about 185° C. to about 215° C. in the presence of air which has a dew point between about −30° C. and about −100° C.

3. The process of claim 2 wherein the air to chip ratio is maintained at a value of from about 0.85 to about 4 standard cubic feet of air per minute/pound of polyethylene terephthalate per hour and the vapor velocity is from about 0.5 to about 4 feet per second.

4. The process of claim 1 wherein the acetaldehyde level of the polyethylene terephthalate product is less than about 2 parts per million, the generation rate of acetaldehyde is from about 2 to about 3 parts per million per minute, and the intrinsic viscosity is from about 0.65 to about 0.85 deciliters per gram.

5. The process of claim 1 wherein the air to chip ratio is maintained at a predetermined value of at least about 1 standard cubic foot of air per minute/pound of polyethylene terephthalate per hour.

6. A continuous process for reducing the acetaldehyde content and the generation rate of acetaldehyde of polyethylene terephtalate chip which has a crystallinity of at least about 30% in order to render the polyethylene terephthalate suitable for making containers, which process comprises stabilizing said polyethylene terephthalate by moving it downward and heating it in a stabilization zone at a temperature of about 190° to about 210° C. for from about 6 to about 12 hours in a countercurrent stream of air and maintaining an air to chip ratio at a predetermined value of from about 1.25 to about 2.5 standard cubic feed of air per minute/pound of polyethylene terephthalate per hour and at a vapor velocity of from about 1 to about 2 feet per second, said air having a dew point of from about −40° to about −80° C., in order to reduce the acetaldehyde level of said crystallized polyethylene terephtalate to less than about 1.5 parts per million, to reduce the generation rate of acetaldehyde to a value of from about 2 to about 3 parts per million per minute, and to increase the intrinsic viscosity to a value in the range of from about 0.70 to about 0.80 deciliter per gram calculated from measurements made on an 8% by weight solution in o-chlorophenol at 25° C.

7. A process for reducing the acetaldehyde content and the generation rate of acetaldehyde of polyethylene terephthalate chip which has an intrinsic viscosity of from about 0.55 to about 0.75 deciliter per gram as calculated from measurements made on an 8 percent by weight solution in o-chlorophenol at 25° C. in order to render the polyethylene terephthalate suitable for making containers, which process comprises (a) crystallizing said polyethylene terephthalate chip by agitating and simultaneously heating it to a temperature of from about 110° to about 240° C. for at least about 3 minutes in order to impart a crystallinity of at least about 30% to said polyethylene terephthalate and to reduce the acetaldehyde content of said polyethylene terephthalate to less than about 20 parts per million, and (b) stabilizing said crystallized polyethylene terephthalate chip by moving it downward and heating it in a stabilization zone at a temperature of from about 180° to about 220° C. for from about 2 to about 20 hours in a counter-current stream of air and maintaining an air to chip ratio at a predetermined value of at least about 0.8 standard cubic foot of air per minute/pound of polyethylene terephthalate per hour and at a vapor velocity of at least about 0.5 foot per second, said air having a dew point of less than about −30° C., in order to reduce the acetaldehyde level of said crystallized polyethylene terephthalate to less than about 2.5 parts per million, to reduce the generation rate of acethaldehyde to less than about 3.0 parts per million per minute, and to increase the intrinsic viscosity to a value in the range of from about 0.60 to about 0.95 deciliters per gram.

8. The process of claim 7 wherein the polyethylene terephthalate chip is stabilized substantially immediately after being crystallized and wherein the air to chip ratio is maintained at a predetermined value of from about 0.85 to about 4 standard cubic feet of air per minute/pound of polyethylene terephthalate per hour.

9. The process of claim 7 wherein the crystallization step is carried out at a temperature of from about 130° to about 225° C. for from about 4 to about 40 minutes and wherein the crystallinity of the polyethylene terephthalate product resulting from the crystallization step is from about 35 to about 45%.

10. The process of claim 7 wherein the crystallized polyethylene terephthalate is heated for from about 4 to about 16 hours at a temperature of from about 185° C. to about 215° C. in the presence of air which has a dew point between about −30° C. and about −100° C.

11. The process of claim 10 wherein the air to chip ratio is from about 1 to about 4 standard cubic feet of air per minute/pound of polyethylene terephthalate per hour and the vapor velocity is from about 0.5 to about 4 feet per second.

12. The process of claim 7 wherein the acetaldehyde level of the polyethylene terephthalate product is less than about 2 parts per million, the generation rate of acetaldehyde is from about 2.2 to about 2.6 parts per million per minute, and the intrinsic viscosity is from about 0.65 to about 0.85 deciliters per gram.

13. The process of claim 7 wherein the crystallization is carried out in the presence of air which flow at the rate of from about 1 to about 50% of the rate at which the air flows through the polyethylene terephthalate chip during the stabilization step.

14. A continuous process for reducing the acetaldehyde content and the generation rate of acetaldehyde of polyethylene terephthalate chip which has an intrinsic viscosity of from about 0.62 to about 0.68 deciliters per gram as calculated from measurements made on an 8% by weight solution in o-chlorophenol at 25° C. in order to render the polyethylene terephthalate suitable for making containers, which process comprises (a) crystallizing said polyethylene terephthalate chip by agitating and simultaneously heating it to a temperature of from about 150° to about 210° C. for from about 5 to about 20 minutes in order to impart a crystallinity of from about 35 to about 45% to said polyethylene terephthalate and to reduce the acetaldehyde content of said polyethylene terephthalate to less than about 10 parts per million and the moisture content to from about 0.02 to about 0.03%, and (b) stabilizing said crystallized polyethylene terephthalate chip by moving it downward and heating it in a stabilization zone at a temperature of from about 190° to about 210° C. for from about 6 to about 12 hours in a counter-current stream of air and maintaining an air to chip ratio at a predetermined value of from about 0.95 to about 2.5 cubic feet of air per minute/pound of polyethylene terephthalate chip per hour and at a vapor velocity of from about 1 to about 2 feet per second, said air having a dew point of from about −40° to about −80° C., in order to reduce the acetaldehyde level of said crystallized polyethylene terephthalate to less than about 1.5 parts per million, to reduce the generation rate of acetaldehyde to a value of from about 2.2 to about 2.6 parts per million per minute, and to increase the intrinsic viscosity to a value in the range of from about 0.70 to about 0.80 deciliters per gram.

15. A process for molding a polyethylene terephthalate container comprising melting the polymer produced in claim 1, forming it into a desired shape, and cooling the molten polymer.

* * * * *